(12) United States Patent
Stol et al.

(10) Patent No.: US 8,256,657 B2
(45) Date of Patent: Sep. 4, 2012

(54) ADVANCED MULTI-SHOULDERED FIXED BOBBIN TOOLS FOR SIMULTANEOUS FRICTION STIR WELDING OF MULTIPLE PARALLEL WALLS BETWEEN PARTS

(75) Inventors: Israel Stol, Pittsburgh, PA (US); John W. Cobes, Lower Burrell, PA (US); Trent A. Chontas, Braddock Hills, PA (US); Joseph M. Fridy, Pittsburgh, PA (US)

(73) Assignee: Alcoa Inc., Pittsburgh, PA (US)

( * ) Notice: Subject to any disclaimer, the term of this patent is extended or adjusted under 35 U.S.C. 154(b) by 331 days.

(21) Appl. No.: 12/601,501

(22) PCT Filed: Mar. 16, 2009

(86) PCT No.: PCT/US2009/037300
§ 371 (c)(1),
(2), (4) Date: Nov. 23, 2009

(87) PCT Pub. No.: WO2009/114861
PCT Pub. Date: Sep. 17, 2009

(65) Prior Publication Data
US 2010/0163603 A1 Jul. 1, 2010

Related U.S. Application Data

(63) Continuation-in-part of application No. 12/048,696, filed on Mar. 14, 2008, now Pat. No. 7,854,362.

(51) Int. Cl.
*B23K 20/12* (2006.01)
(52) U.S. Cl. ........................ 228/2.1; 228/112.1
(58) Field of Classification Search ............. 228/112.1, 228/2.1
See application file for complete search history.

(56) References Cited

U.S. PATENT DOCUMENTS 2,227,627 A 1/1941 Bruzon
(Continued)

FOREIGN PATENT DOCUMENTS
DE 102005030800 1/2007
(Continued)

OTHER PUBLICATIONS

Office Action relating to U.S. Appl. No. 11/868,262, dated Jan. 8, 2010.
(Continued)

*Primary Examiner* — Jessica L. Ward
*Assistant Examiner* — Steven Ha
(74) *Attorney, Agent, or Firm* — Greenberg Traurig, LLP

(57) ABSTRACT

A multi-shouldered friction stir welding tool (10) comprises an integral shank-pin unit (11) having a plurality of pin portions on the shank-pin unit, where the plurality of pin portions for driving into a plurality of joints to perform a friction stir welding operation on the corresponding plurality of joints and, where a shank portion of the shank-pin unit is for attachment to an optional axial tension rod (19), each of the friction stir welding modules comprises a pair of shoulders (13, 14) that is connected to the shank-pin unit where each shoulder has a distal end and a proximal end, where the proximal end of each shoulder faces the pin portion of the shank-pin unit, whereby the shoulder and pin(s) rotate in unison, and a pair of split collars or a pair of nuts that is connected to the shank-pin unit and faces the distal end of each shoulder, where the plurality of friction stir welding modules are connected to each other whereby the modules rotate in unison to simultaneously make a plurality of parallel welds. In addition, a method of friction stir welding a plurality of joints simultaneously comprising using at least one multi-shouldered friction stir welding tool is provided.

6 Claims, 15 Drawing Sheets

U.S. PATENT DOCUMENTS

| | | | |
|---|---|---|---|
| 2,351,996 A | 6/1944 | Morgan | |
| 2,857,793 A | 10/1958 | Lucien | |
| 3,264,446 A | 8/1966 | Gronlund | |
| 3,487,530 A | 1/1970 | Ely | |
| 3,555,239 A | 1/1971 | Kerth | |
| 3,604,612 A | 9/1971 | Miller et al. | |
| 3,643,969 A | 2/1972 | Finley et al. | |
| 3,684,855 A | 8/1972 | Wepfer et al. | |
| 3,702,914 A | 11/1972 | Noura | |
| 3,718,798 A | 2/1973 | Randolph et al. | |
| 3,789,181 A | 1/1974 | Netterstedt et al. | |
| 3,873,798 A | 3/1975 | Friedman et al. | |
| 3,877,629 A | 4/1975 | Louw et al. | |
| 3,942,337 A | 3/1976 | Leonard et al. | |
| 4,122,990 A | 10/1978 | Tasaki et al. | |
| 4,260,869 A | 4/1981 | Stevens et al. | |
| 4,272,973 A | 6/1981 | Fu-Tsai | |
| 4,356,574 A | 11/1982 | Johnson | |
| 4,483,106 A | 11/1984 | Wachs et al. | |
| 4,517,865 A | 5/1985 | Huang | |
| 4,659,903 A | 4/1987 | Berne et al. | |
| 4,767,048 A | 8/1988 | Kimbrough et al. | |
| 4,809,572 A | 3/1989 | Sasaki | |
| 4,835,829 A | 6/1989 | Welschoff et al. | |
| 5,460,317 A | 10/1995 | Thomas et al. | |
| 5,697,544 A | 12/1997 | Wkyes | |
| 5,725,698 A | 3/1998 | Mahoney | |
| 5,796,068 A | 8/1998 | Jones | |
| 5,971,252 A | 10/1999 | Rosen et al. | |
| 5,975,406 A | 11/1999 | Mahoney et al. | |
| 6,029,879 A | 2/2000 | Cocks | |
| 6,053,391 A | 4/2000 | Heiderman et al. | |
| 6,132,435 A | 10/2000 | Young | |
| 6,227,430 B1 | 5/2001 | Rosen et al. | |
| 6,237,829 B1 | 5/2001 | Aota et al. | |
| 6,237,835 B1 | 5/2001 | Litwinkski et al. | |
| 6,257,479 B1 | 7/2001 | Liwinski et al. | |
| 6,273,323 B1 | 8/2001 | Ezumi et al. | |
| 6,325,273 B1 | 12/2001 | Boon et al. | |
| 6,367,524 B1 | 4/2002 | Brewer | |
| 6,419,142 B1 | 7/2002 | Larsson | |
| 6,487,943 B1 | 12/2002 | Jansson et al. | |
| 6,497,355 B1 | 12/2002 | Ding et al. | |
| 6,510,975 B2 | 1/2003 | Enomoto | |
| 6,516,992 B1 | 2/2003 | Colligan | |
| 6,638,641 B2 | 10/2003 | Delano | |
| 6,648,206 B2 | 11/2003 | Nelson et al. | |
| 6,669,075 B2 | 12/2003 | Colligan | |
| 6,676,004 B1 | 1/2004 | Trapp et al. | |
| 6,685,081 B2 | 2/2004 | Iwata | |
| 6,706,130 B1 | 3/2004 | Minamitani et al. | |
| 6,712,007 B2 | 3/2004 | Yamamoto et al. | |
| 6,758,382 B1 | 7/2004 | Carter | |
| 6,779,704 B2 | 8/2004 | Nelson et al. | |
| 6,779,709 B2 | 8/2004 | Stotler et al. | |
| 6,799,708 B2 | 10/2004 | Von Strombeck et al. | |
| 6,834,889 B2 | 12/2004 | Sunde et al. | |
| 6,880,743 B1 | 4/2005 | Coletta et al. | |
| 6,908,690 B2 | 6/2005 | Waldron et al. | |
| 6,936,332 B2 | 8/2005 | Aota et al. | |
| 6,974,107 B2 | 12/2005 | Christensen et al. | |
| 6,994,242 B2 | 2/2006 | Fuller et al. | |
| 7,025,151 B2 | 4/2006 | Hehli et al. | |
| 7,198,189 B2 | 4/2007 | Stol et al. | |
| 7,275,675 B1 | 10/2007 | Carter et al. | |
| 7,281,647 B2 | 10/2007 | Stol et al. | |
| 7,383,975 B2 | 6/2008 | Stol et al. | |
| 7,401,723 B2 | 7/2008 | Stol et al. | |
| 7,464,852 B2 | 12/2008 | Waldron et al. | |
| 2001/0015369 A1 | 8/2001 | Liwinski et al. | |
| 2001/0025714 A1 | 10/2001 | Lieser | |
| 2003/0029903 A1 | 2/2003 | Kashiki et al. | |
| 2003/0209588 A1 | 11/2003 | Colligan | |
| 2003/0217452 A1 | 11/2003 | Talwar et al. | |
| 2004/0035914 A1 | 2/2004 | Hempstead | |
| 2004/0150272 A1 | 8/2004 | Gordon et al. | |
| 2004/0191019 A1 | 9/2004 | Lee et al. | |
| 2004/0265065 A1 | 12/2004 | Stecher et al. | |
| 2005/0103824 A1 | 5/2005 | Waldron et al. | |
| 2005/0139640 A1 | 6/2005 | Kay | |
| 2005/0252947 A1 | 11/2005 | Fuji et al. | |
| 2005/0263569 A1 | 12/2005 | Miller | |
| 2006/0006211 A1 | 1/2006 | Loitz et al. | |
| 2006/0049232 A1 | 3/2006 | Murakami | |
| 2006/0157531 A1 | 7/2006 | Packer et al. | |
| 2006/0254788 A1 | 11/2006 | Bucher | |
| 2006/0289604 A1 | 12/2006 | Zettler | |
| 2007/0000972 A1 | 1/2007 | Koga et al. | |
| 2007/0034671 A1 | 2/2007 | Burton et al. | |
| 2008/0217377 A1 | 9/2008 | Stol et al. | |
| 2009/0065553 A1 | 3/2009 | Burg | |
| 2009/0230173 A1 | 9/2009 | Stol et al. | |
| 2010/0108742 A1 | 5/2010 | Stol et al. | |

FOREIGN PATENT DOCUMENTS

| | | |
|---|---|---|
| FR | 2256807 | 8/1975 |
| JP | 11320128 | 11/1999 |
| JP | 11347753 | 12/1999 |
| JP | 2000176657 | 6/2000 |
| JP | 2000202647 | 7/2000 |
| JP | 2001129674 | 5/2001 |
| JP | 2002160077 | 6/2002 |
| JP | 2002263863 | 9/2002 |
| JP | 2003154469 | 5/2003 |
| JP | 2003236680 | 8/2003 |
| JP | 2003360574 | 9/2003 |
| WO | 0005025 | 2/2000 |
| WO | 0174526 | 10/2001 |
| WO | 0185385 | 11/2001 |
| WO | 2006009778 | 1/2006 |
| WO | 2006037051 | 4/2006 |
| WO | 2006081819 | 8/2006 |
| WO | 2008109649 | 9/2008 |
| WO | 2009033157 | 3/2009 |
| WO | 2009114861 | 9/2009 |

OTHER PUBLICATIONS

Office Action relating to U.S. Appl. No. 11/852,072, dated Jan. 6, 2010.

Office Action relating to U.S. Appl. No. 11/868,262, dated Mar. 26, 2010.

Definition of "bearing", Merriam-Webster Online Dictionary. Retrieved Aug. 13, 2009, from http://www.merriam-webster.com/dictionary/beating.

Definition of "monolithic", http://www.thefreedictionary.com/monolithic.

International Patent Application PCT/US05/21313, International Search Report (mailed Sep. 15, 2005).

International Patent Application PCT/US05/21313, Written Opinion (mailed Sep. 15, 2005).

International Patent Application PCT/US05/34848, International Search Report and Written Opinion (mailed Aug. 15, 2006).

International Patent Application PCT/US08/55869, International Search Report and Written Opinion (mailed Sep. 30, 2008).

International Patent Application PCT/US08/75599, International Search Report and Written Opinion (mailed Apr. 15, 2009).

International Patent Application PCT/US09/037300, International Search Report and Written Opinion (mailed Sep. 2, 2009).

International Patent Application PCT/US09/037300, partial International Search Report and and Written Opinion (mailed Jul. 7, 2009).

Office Action relating to Canadian Application No. 2,580,966 (dated Nov. 12, 2008).

Office Action relating to U.S. Appl. No. 11/235,584, dated Jun. 13, 2006.

Office Action relating to U.S. Appl. No. 11/235,584, dated Nov. 21, 2006.

Office Action relating to U.S. Appl. No. 11/852,072, dated Jan. 21, 2009.

Office Action relating to U.S. Appl. No. 11/852,072, dated Sep. 23, 2009.

Office Action relating to U.S. Appl. No. 11/868,262, dated Apr. 30, 2009.

Office Action relating to U.S. Appl. No. 11/868,262, dated Aug. 28, 2009.
Office Action relating to U.S. Appl. No. 11/100,878, dated Oct. 16, 2007.
Office Action relating to U.S. Appl. No. 11/133,083, dated Oct. 31, 2007.
Sclater et al. "Mechanism & Mechanical Devices Sourcebook: Coupling, Clutching, and Braking Devices," Third Edition, Chapter 9, McGraw-Hill, 1991, pp. 302-304.
Series Pamphlet, "Electro Magnectic Clutches (Spring Wrapped) Uni-Directional CEM," Machine Components Corp., available at http://www.machinecomp.com/emc_cem.htm.
Series Pamphlet, "Friction Hinges, Miniature Constant Torque, FH-8," Machine Components Corp., available at http://www.machinecomp.com/fh_mini.htm.
Series Pamphlet, "Slip Couplings, Constant Torque C," Machine Components Corp., available at http://www.machinecomp.com/esc_cs.htm.
Series Pamphlet, "Solenoid Operated Clutch Brakes, Spring Wrapped Type, Non-Reversing, CNR," Machine Components Corp., available at http://www.machinecomp.com/cnr13.htm.
Supplementary Search Report relating to European Application No. EP05800139 (dated Apr. 11, 2008).

ADVANCED MULTI-SHOULDERED FIXED BOBBIN TOOLS FOR SIMULTANEOUS FRICTION STIR WELDING OF MULTIPLE PARALLEL WALLS BETWEEN PARTS

CROSS-REFERENCED APPLICATIONS

The present application is a Continuation-In-Part of U.S. Non-Provisional application Ser. No. 12/048,696, entitled "ADVANCED MULTI-SHOULDERED FIXED BOBBIN TOOLS FOR SIMULTANEOUS FRICTION STIR WELDING OF MULTIPLE PARALLEL WALLS BETWEEN PARTS" filed on Mar. 14, 2008, now U.S. Pat. No. 7,854,362, which is incorporated herein.

BACKGROUND OF THE INVENTION

The present invention relates to a multi-shouldered friction stir welding bobbin tool for friction stir welding and, more particularly, the present invention relates to using a multi-shouldered friction stir welding tool for simultaneous friction stir welding of a plurality of parallel joints between components having parallel portions.

The Friction Stir Welding (FSW) process is a solid-state based joining process, which makes it possible to weld a wide variety of materials alloys (aluminum, copper, stainless steel, etc.) to themselves and combinations (e.g. 6XXX/5XXX, 2XXX/7XXX, etc.) The joining is effected by a rotating FSW tool, which is forced into the joining area to heat it by friction and thus "plasticizes" the parts about it. Plasticized material flows around the axis of the rotating FSW tool, and the plasticized regions coalesce into sound metallurgical bonds.

In one embodiment, the present invention discloses a multi-shouldered friction stir welding tool comprising an integral shank-pin unit having a plurality of pin portions on the shank-pin unit, where the plurality of pin portions for plunging into a plurality of joints to perform a friction stir welding operation on the corresponding plurality of joints and, where a shank portion of the shank-pin unit is for attachment to an optional axial tension rod, a plurality of friction stir welding modules, each of the friction stir welding modules comprising a pair of shoulders that is connected to the shank-pin unit where each shoulder has a distal end and a proximal end, where the proximal end of each shoulder faces the pin portion of the shank-pin unit, whereby the shoulder and pin(s) rotate in unison, and a pair of split collars or a pair of nuts that is connected to the shank-pin unit and faces the distal end of each shoulder, where the plurality of friction stir welding modules are connected to each other whereby the modules rotate in unison to simultaneously make a plurality of parallel welds.

SUMMARY OF THE INVENTION

In one embodiment, the present invention provides a multi-shouldered friction stir welding tool for simultaneous friction stir welding of a plurality of parallel joints between components having parallel portions. The multi-shouldered friction stir welding tool comprising an integral shank-pin unit having a plurality of pin portions on the shank-pin unit, where the plurality of pin portions for driving into a plurality of joints to perform a friction stir welding operation on the corresponding plurality of joints and, where a shank portion of the shank-pin unit is for attachment to an optional axial tension rod, a plurality of friction stir welding modules, each of the friction stir welding modules comprising a pair of shoulders that is connected to the shank-pin unit where each shoulder has a distal end and a proximal end, where the proximal end of each shoulder faces the pin portion of the shank-pin unit, whereby the shoulder and pin(s) rotate in unison, and a pair of split collars or a pair of nuts that is connected to the shank-pin unit and faces the distal end of each shoulder, where the plurality of friction stir welding modules are connected to each other whereby the modules rotate in unison to simultaneously make a plurality of parallel welds.

In one embodiment, the axial tension rod is disposed within the shank portion of the multi-shouldered friction stir welding tool shank-pin unit. In another embodiment, the shank-pin unit contains a loading means for placing the axial tension rod in tension and the shank-pin in compression.

In a further embodiment, the shank-pin unit has threadless ends with at least two flats along the length of the shank-pin unit. In another embodiment, each shoulder has an opening to facilitate contact with threads on the shank-pin unit.

In yet another embodiment, each split collar has a threaded outer diameter and a threaded inner diameter that is connected to the shank-pin unit by threading the outer diameter of the collar onto threads on an inner diameter of the shoulder and threading the inner diameter of the collar onto threads on an outer diameter of the shank-pin unit. In another embodiment, each split collar is further tightened against or connected to the shank-pin unit by screws.

In another embodiment, the shank-pin is made of a solid rod.

In a further embodiment, each nut has a threaded outer diameter and a threaded inner diameter that is connected to the shank-pin unit by threading the outer diameter of the nut onto threads on an inner diameter of a shoulder and threading the inner diameter of the nut onto threads on an outer diameter of the shank-pin unit. In another embodiment, each nut is further tightened against or connected to the shank-pin unit by screws. In another embodiment, each nut is further connected to the shank-pin unit by jam nuts.

In a further embodiment, the shoulder may be a drive shank with an integrated shoulder.

In yet another embodiment, the loading means for placing the axial tension rod in tension and the pin-shank in compression is a bearing disposed in a shank-pin unit end for disengaging and relieving the torque experienced by the pin portions of the shank-pin unit during the friction stir welding operation.

In yet another embodiment, the distal end of the shoulder and the threaded outer diameter of the collar create a small pocket to prevent the plasticized material from flowing out of the joint.

In yet another embodiment, the present invention provides a method of friction stir welding a plurality of parallel joints simultaneously using at least one multi-shouldered friction stir welding tool. In a further embodiment, the two multi-shouldered friction stir welding tools are simultaneously driven by a rotation-splitting transmission system or by two synchronized Servo controlled motors.

Accordingly, it is one embodiment of the invention to provide a multi-shouldered friction stir welding tool for simultaneous friction stir welding of a plurality of parallel joints between components having parallel portions.

It is another embodiment of the invention to provide a method of friction stir welding a plurality of joints simultaneously using at least one multi-shouldered friction stir welding tool as claimed herein.

These and other further embodiments of the invention will become more apparent through the following description and drawings.

BRIEF DESCRIPTION OF THE DRAWINGS

For a fuller understanding of the invention, reference is made to the following description taken in connection with the accompanying drawings, in which.

DETAILED DESCRIPTION OF THE PREFERRED EMBODIMENTS

The present invention provides multi-shouldered fixed bobbin tools that afford simultaneous friction stir welding of multiple parallel joints between parts, such as sheet, plate a flange or a web, a planner portion of an extrusion, a planner portion of a casting, etc.

In the discussion which follows, directional terms such as "upper", "lower", "top", "bottom", etc., apply relative to welding setups oriented with the bottom end of the FSW tool at the bottom and the shank end at the top. The terms "distal" and "proximal" are also used. Distal has the meaning of farthest from the pins of the FSW tool, proximal means nearer.

In one embodiment, the present invention discloses a multi-shouldered friction stir welding tool comprised of an integral shank-pin unit having a plurality of pin portions on the shank-pin unit, where the plurality of pin portions for plunging into a plurality of joints to perform a friction stir welding operation on the corresponding plurality of joints and, where a shank portion of the shank-pin unit is for attachment to an optional axial tension rod, a plurality of friction stir welding modules, each of the friction stir welding modules comprising a pair of shoulders that is connected to the shank-pin unit where each shoulder has a distal end and a proximal end, where the proximal end of each shoulder faces the pin portion of the shank-pin unit, whereby the shoulder and pin(s) rotate in unison, and a pair of split collars or a pair of nuts that is connected to the shank-pin unit and faces the distal end of each shoulder, where the plurality of friction stir welding modules may be directly or indirectly connected to each other whereby the modules rotate in unison to simultaneously make a plurality of parallel welds. For example, the plurality of friction stir welding modules may be connected laterally and rotationally through flexible links.

In one embodiment, to friction stir weld with a multi-shouldered fixed bobbin tool: a) multiple parallel joints (e.g. 2, 4), b) relatively thick walls (2.5 cm), and c) tough/strong alloys (e.g. 7085), the tool must be extra strong to resist the severe cyclic bending and twisting at its pins during welding. To prevent the intense cyclic bending and twisting during welding of multiple parallel joints of the FSW tool, the present invention advances the concept of combining the use of compression loading of the pins, between the shoulders, with the aid of an internal tension member and also the concept of an integral pin/shank ensemble with a self-locking shoulder and a split collar threaded onto the pin/shank ensemble.

Figure 1:
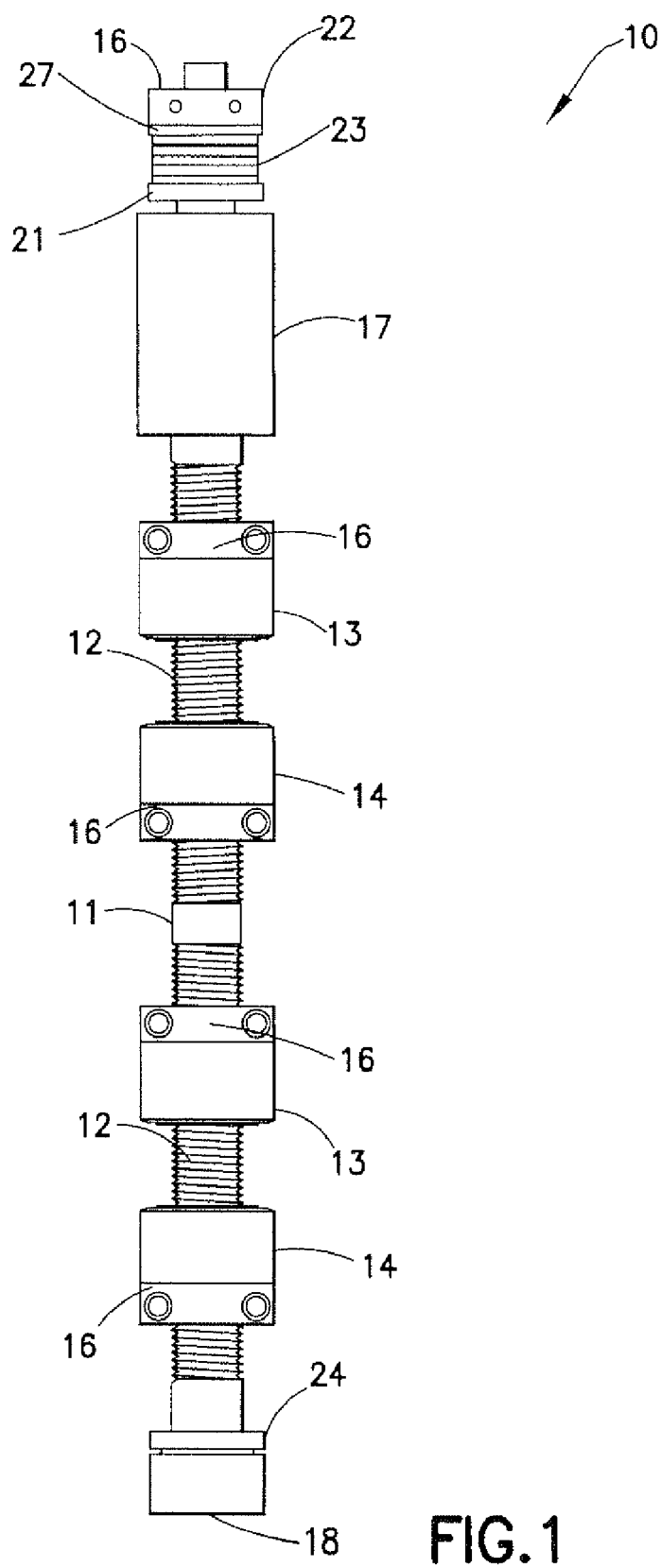
FIG. 1 is an elevational view of one embodiment of a multi-shoulder bobbin type friction stir welding tool for simultaneously welding two parallel joints in accordance with an embodiment of the present invention.
Figure 3A:
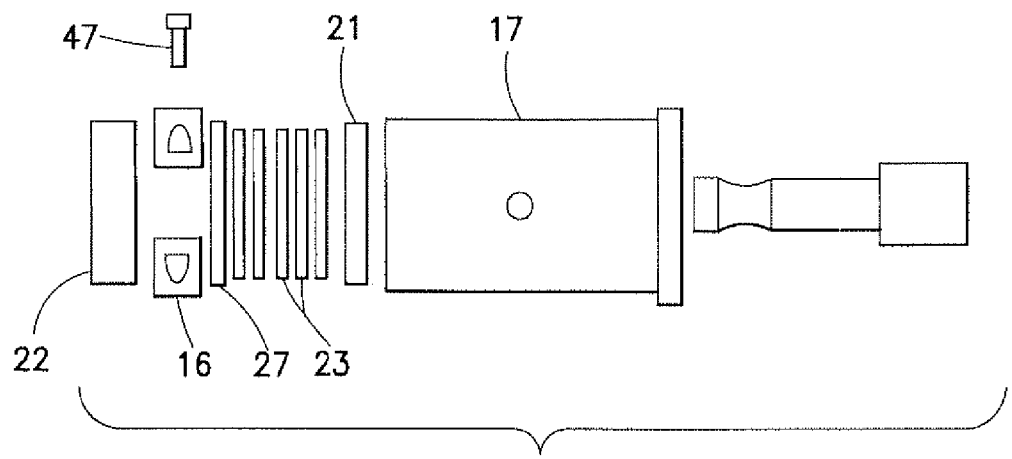
FIG. 3A is an exploded view of one embodiment of the drive shank assembly end of the multi-shoulder bobbin type friction stir welding tool of FIG. 1.

In one embodiment, FIG. 1 shows a multi-shoulder bobbin type friction stir welding tool 10 ("FSW tool") according to the present invention. In one example, FSW tool 10 is for making two parallel welds simultaneously and includes an integral shank-pin unit 11 which may be held in a chuck or collet of a friction stir welding machine. In one example, FSW tool 10 also includes two pins 12 with each having a left shoulder 13 and a right shoulder 14 surrounding pins 12. Each left shoulder 13 and right shoulder 14 has a split collar 16. In yet another example, split collars 16 firmly secure each shoulder 13 and 14 to shank-pin unit 11. At one end of FSW tool 10 is a drive shank 17 where FSW tool 10 is attached to the friction stir welding machine collet (not shown). At the end of the drive shank 17, the mechanism that puts the tension member in tension and thus putting the pin into compression, is located. This mechanism is comprised of a race/support 21 and a collar retainer 22 underneath which is located a split collar 16, a washer 27, and a plurality of disc springs 23 therebetween as shown in FIG. 3A. Race/support 21 and disc springs 23 may, for example only, be a Belleville™ race/support and a Belleville™ disc springs, respectively. At the other end of FSW tool 10 is a thrust bearing retainer 18. Washer 24 prevents ends of shank-pin unit 11 from pushing against bearing 26.

In another embodiment, split collars 16 are replaced with nuts that are also called capture adjusting nuts. In a further embodiment, FSW tool may be for making more than two parallel welds.

In the following discussion, it is presumed that FSW tool 10 is to be rotated clockwise. In this case, both shoulders 14 are right handed shoulders, that is to say, have clockwise inner diameter threads and both of the shoulders 13 are left handed shoulders, that is to say, they have counterclockwise inner diameter threads.

Figure 4A:
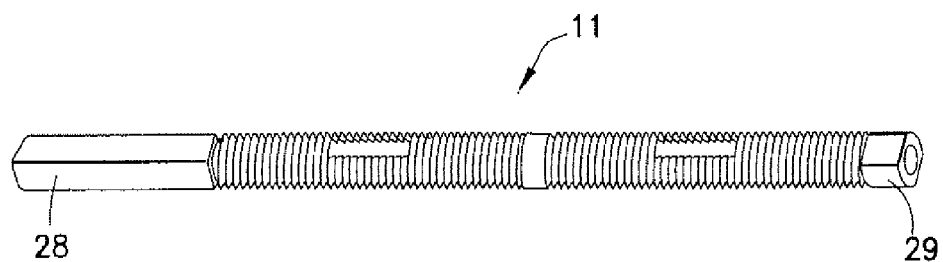
FIG. 4A is an elevational view of one embodiment of the integral shank-pin unit used in the multi-shoulder bobbin type friction stir welding tool in accordance with an embodiment of the present invention.
Figure 4B:
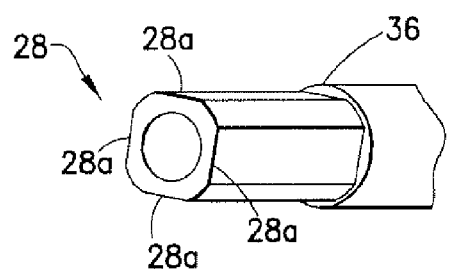
FIG. 4B is a perspective view of one embodiment of the threadless bottom end of shank-pin unit of FIG. 4A.
Figure 4C:
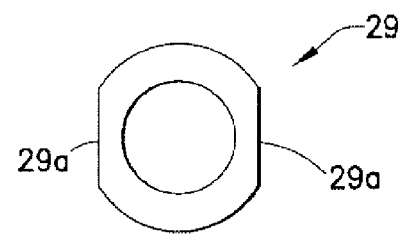
FIG. 4C is a front view of one embodiment of the threadless top end of shank-pin unit of FIG. 4A.
Figure 4D:
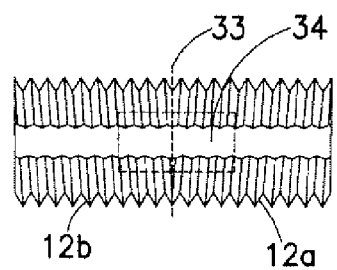
FIG. 4D is a view of one embodiment of the threads on pins 12 of shank-pin unit of FIG. 4A.
Figure 6A:
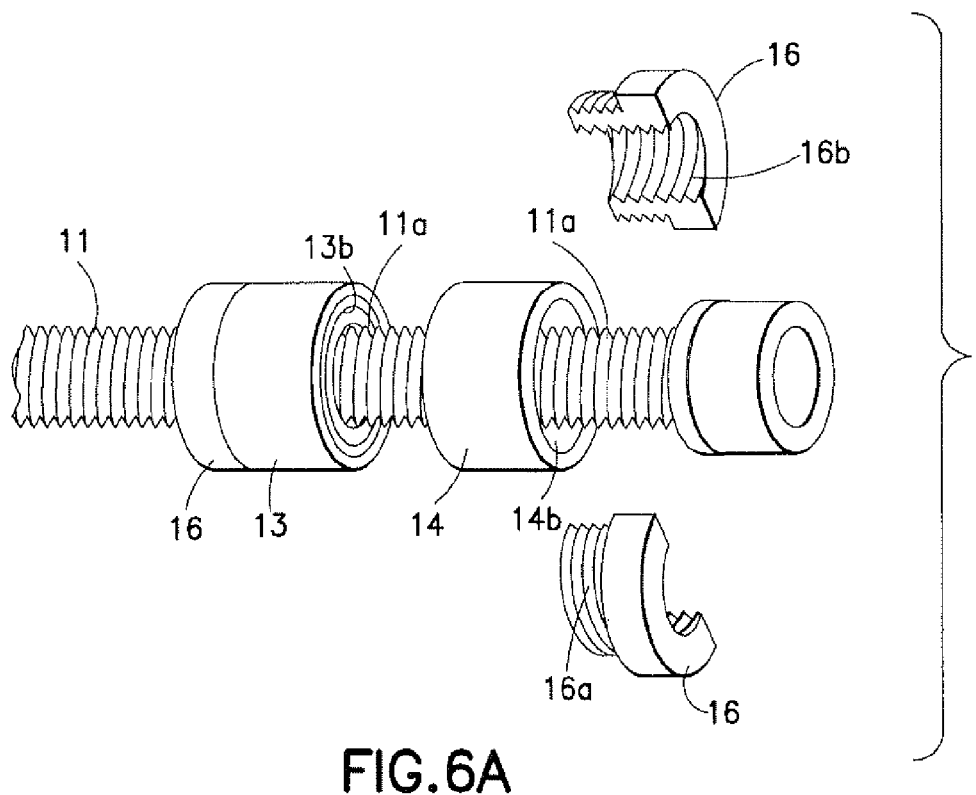
FIGS. 6A and 6B are elevational views of one embodiment of assembling a shoulder onto the shank-pin unit with a split collar in accordance with an embodiment of the present invention.
Figure 6B:
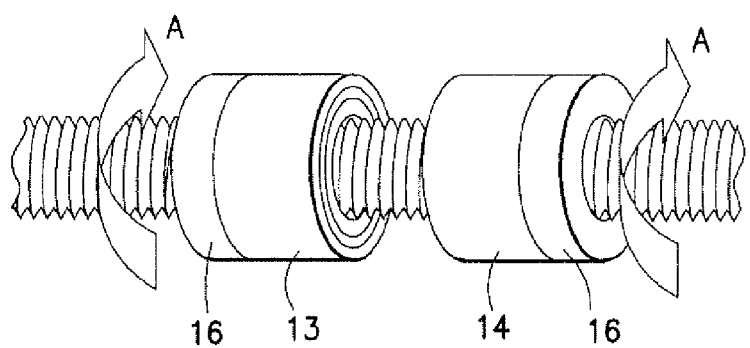

As will be discussed in more detail below, each pin 12 has at least one flat area 34 that exists across the two types of threads as shown in FIG. 4D. These flats 34 prevent shoulders 13 and 14 from rotating during the engagement with split collars 16 and during friction stir welding. As shown in FIGS. 6A and 6B, shoulders 13 and 14 are affixed to shank-pin unit 11 through split collars 16, where each half of these split collars 16 has threads on an inner diameter 16b and an outer diameter 16a, while each of the shoulders 13 and 14 has threads on an inner diameter 13b and 14b, respectively. Shoulders 13 and 14 are affixed to the shank-pin unit 11 by turning and threading in split collars 16, so that their inner diameter 16b is threaded onto shank-pin unit 11 and their outer diameter 16a is threaded into the inner diameter 13b and 14b of shoulders 13 and 14. When split collars 16 are jammed-threaded against the threads on an outer diameter 11a of shank-pin unit 11 and inner diameter 13b and 14b of the shoulders, shoulders 13 and 14 get located and fixed along shank-pin unit 11.

Here, right hand shoulder 14 that is more towards the right is attached to shank-pin unit 11 having a shank portion and a pin portion 12a as shown in FIG. 4D. Right hand shoulder 14 that is more towards the left is attached to the same shank-pin unit 11 which includes pin portion 12a.

Similarly, left handed shoulder 13 is attached to shank-pin unit 11 having a shank portion and a pin portion 12b as shown in FIG. 4D. Left handed shoulder 13 that is more towards the right is attached to the same shank-pin unit 11 which includes pin portion 12b.

The threads on pin portions 12a are left handed threads, so that plasticized material is urged from a merge point 33 of pin portion 12a and pin portion 12b towards the scroll shoulders when FSW tool 10 is rotated in a clockwise direction. Likewise, the threads on pin portions 12b are right handed threads so that plasticized material is urged toward the corresponding shoulder when FSW tool 10 is so rotated. Also, split collars 16 firmly secure each shoulder 13 and 14 to shank-pin unit 11 in the correct place. Moreover, in one embodiment, optionally screws may be used to connect the two halves of split collar for extra security as shown in FIG. 7B.

Figure 2:
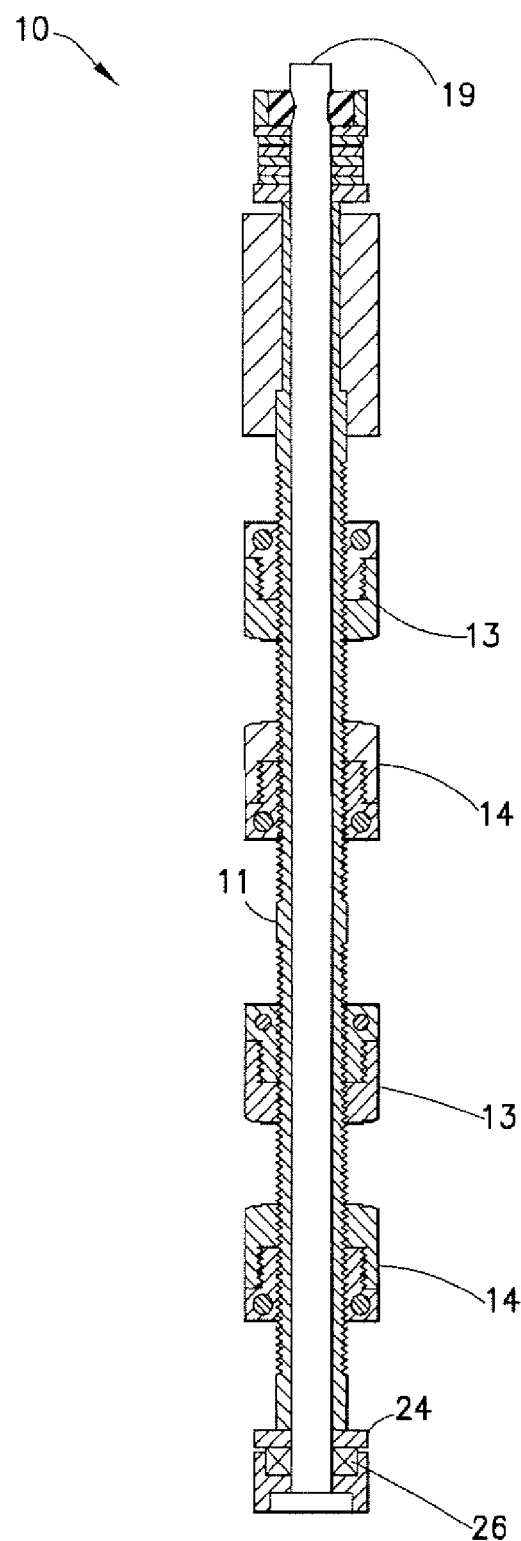
FIG. 2 is a cross-sectional view of one embodiment of the multi-shoulder bobbin type stir welding tool of FIG. 1 with an internal tension rod.

In one embodiment, the cross-sectional view of FSW tool 10 is shown in FIG. 2. Here, an axial tension rod 19 is disposed along the entire length of the shank-pin unit 11. When this rod 19 is put under tension, it puts the shark-pin under compression, parts of which are the pins between shoulders 14 and 13.

Figure 3B:
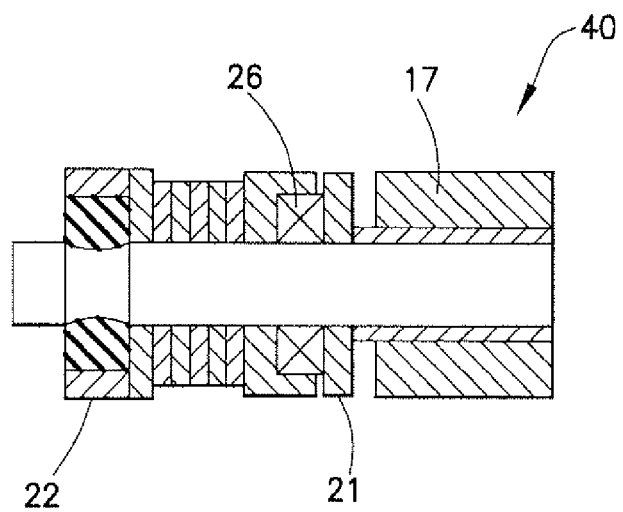
FIG. 3B is a cross-sectional view of one embodiment of an assembled drive shank assembly end with a thrust bearing for disengaging the tension rod from the torsion experienced by the pin shank of the multi-shoulder bobbin type friction stir welding tool in accordance with another embodiment of the present invention.
Figure 3C:
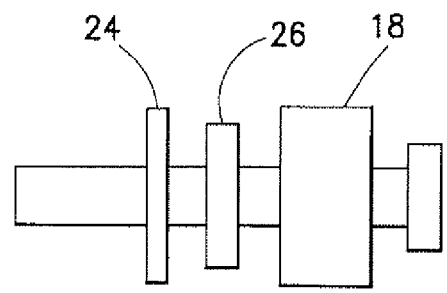
FIG. 3C is an exploded view of one embodiment of the bottom end of the thrust bearing end of the multi-shoulder bobbin type friction stir welding tool of FIG. 1.

In one embodiment, FIG. 3A shows an exploded view of drive shank assembly of FSW tool 10. In one embodiment, FIG. 3B shows a cross-sectional view of an assembled drive shank assembly end 40 with thrust bearing 26. In one embodiment, FIG. 3C shows a bearing race 24 and thrust bearing retainer 18 holding thrust bearing 26 in place. In another embodiment of the present invention, thrust bearing 26 may be located at the drive shank end of the FSW tool as shown in FIG. 3B. Here, thrust bearing 26 is located between race/support 21 and collar retainer 22. Race/support 21 may, for example only, be a steel washer.

In one embodiment, one of the purposes of the thrust bearing 26 also called the swivel portion is to disengage and relieve the internal tension rod from the torsion experienced by the pins during the FSW operation.

In another embodiment, the shank-pin unit is a solid rod without an internal tension rod. In this case, a thrust bearing is not needed in the FSW tool.

FIG. 4A shows a hollow shank-pin unit 11 to possibly accommodate an internal tension rod in accordance with one embodiment of the present invention. Shank-pin unit 11 has a threadless top end 28 and a threadless bottom end 29. Threadless top end 28 has a drive collar torque with four flats 28a (FIG. 4B) for engaging with drive shank 17 (FIG. 1). In one embodiment, flats 28a are on the top, bottom, left and right side of threadless top end 28 as shown in FIG. 4B. There is also a collar stop feature 36, which is comprised of the ends of the four flats 28a, against which the end face of the shank rests.

FIG. 4C shows the front view of threadless bottom end 29 with tool shoulder torque flats 29a in accordance with one embodiment of the present invention. There are two opposite flats 29a on threadless bottom end 29 for engaging with a "swivel" mechanism, when it is separate from an internal tension rod 19 with a tensioning mechanism, based on washers 27 (FIG. 3A) which may, for example only, be Bellville™ washers on the other end of shank-pin unit 11.

In one embodiment, FIG. 4D is a view of the alternating left hand threads 12b and right hand threads 12a on shank-pin unit 11 with merge point 33 between the two types of threads. A flat area 34 exists across the two types of threads as shown in FIG. 4D. In one embodiment, shank-pin unit is threaded with opposite threads along its entire length. In another embodiment, shank-pin unit is threaded with opposite threads only where the pins are located and the threads are machined flat 120 or 90 degrees apart along the entire length of the pin-shank. These flats prevent the shoulders from rotating during the engagement with the split collars.

Figure 5A:
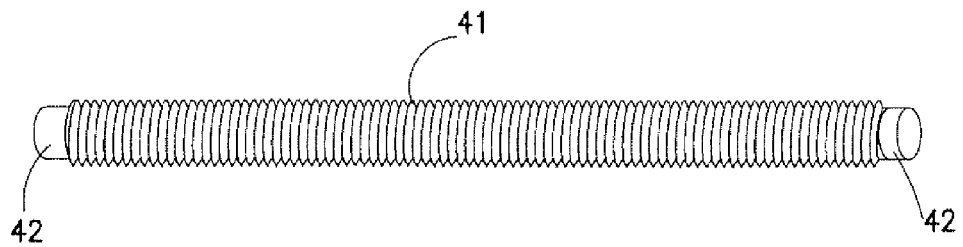
FIG. 5A is an elevational view of one embodiment of the integral shank-pin unit used in the multi-shoulder bobbin type friction stir welding tool in accordance with another embodiment of the present invention.
Figure 5B:
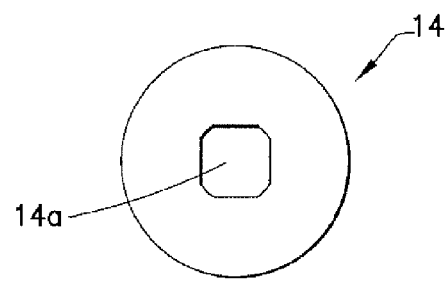
FIG. 5B is a front view of one embodiment of a shoulder used on the integral shank-pin unit of FIG. 5A in accordance with an embodiment of the present invention.
Figure 5C:
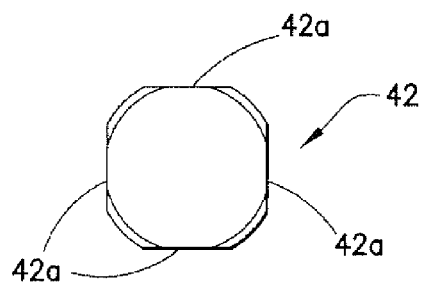
FIG. 5C is a front view of one embodiment of one end of shank-pin unit of FIG. 5A.

FIG. 5A shows another embodiment where a shank-pin unit 41 is solid. FIG. 5B shows the flats that are machined into the opening 14a of shoulder 14 to be used on the FSW tool to engage with corresponding flats 42a on shank-pin unit 41 to prevent the rotation of shoulder 14 during welding. This tight fit between the opening 14a of shoulder 14 and an end 42 of shank-pin unit 41 reduces plasticized material from propagating or extruding into the threaded connection between the inner diameter of shoulder 14 and the outer diameter of shank-pin unit 41, which facilitates the ease of assembly, disassembly and adjustment of location of each shoulder.

The opening on each of the shoulders is designed to slip over the thread of the shank-pin unit and engage with flats during the welding operation. This opening in conjunction with the thread on the shoulder's inner diameter allow the placement of each shoulder, exactly where it needs to be along the shank-pin assembly and firmly secured to the shank-pin unit with the aid of the split collar.

In one embodiment, FIG. 6A shows how split collar 16 is engaged with shoulder 14. Here, split collar 16 has an outside diameter 16a and an inside diameter 16b that is threaded. Split collar 16 is comprised of two halves. Once the two halves of split collar 16 are assembled it is screwed into the back end of shoulder 14. The threads on an inner diameter 14b (shown in FIG. 8) of shoulder 14 contact the threads on outside diameter 16a of split collar 16. The threads on the inner diameter 16b of split collar 16 are threaded on an outer diameter 11a (shown in FIG. 8) of shank-pin unit 11. Split collar 16 is rotated to engage shoulders 13 and 14, as shown by arrows A in FIG. 6B, to the outer diameter threads on the shank-pin 11. Optionally, in another embodiment, the two halves of split collar 16 may be further secured by the used of a set of screws 47 as shown in FIG. 7B.

Figure 7A:
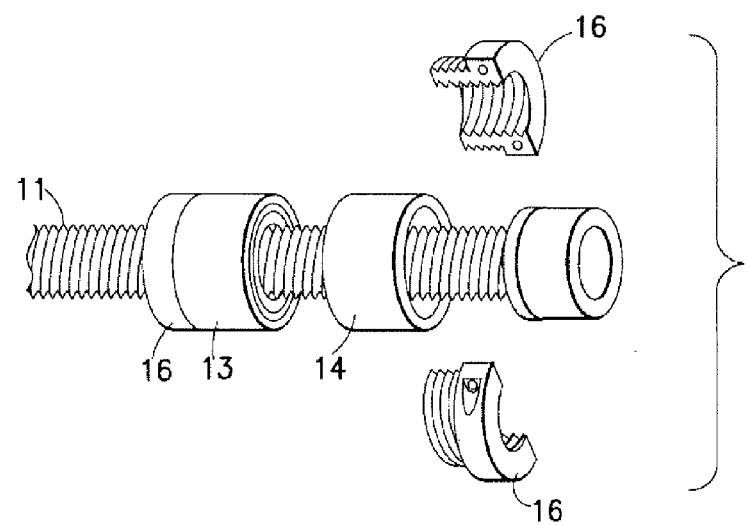
FIGS. 7A, 7B and 7C are elevational views of one embodiment of assembling a shoulder onto the shank-pin unit with a split collar in accordance with another embodiment of the present invention.
Figure 7B:
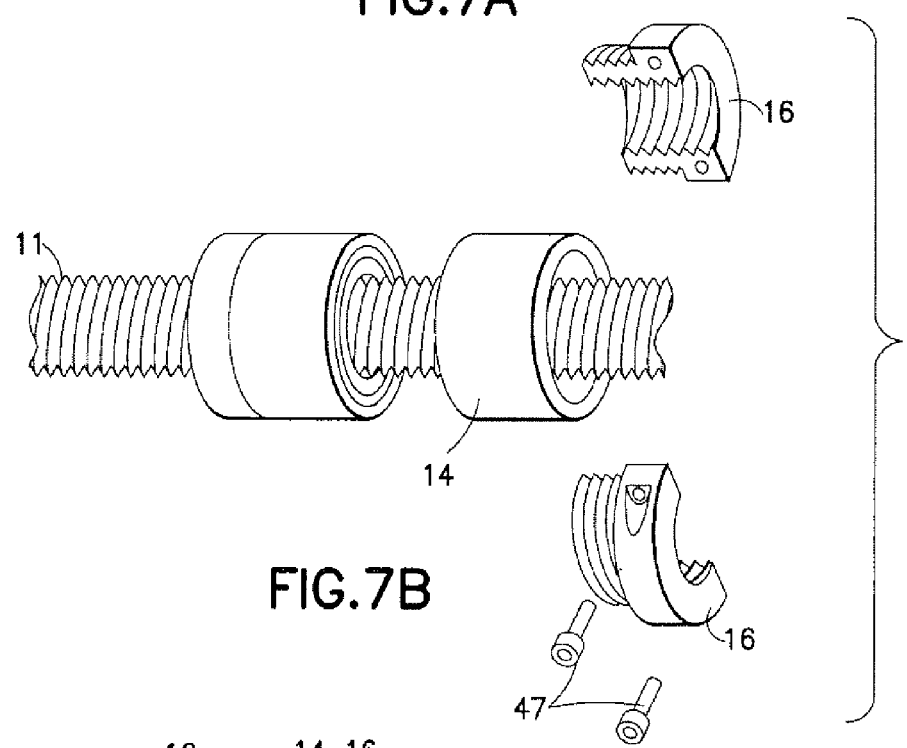
Figure 7C:
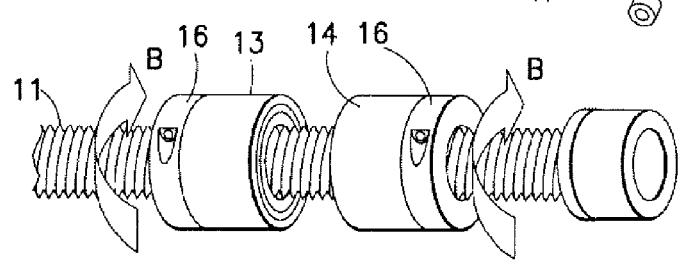

FIGS. 7A, 7B and 7C show assembling shoulder 14 onto the shank-pin unit 11 where a split collar 16 is secured to the shank-pin unit with a set of screws 47 in accordance with an embodiment of the present invention. First, shoulder 14 is slipped over shank-pin 11 where it should be secured for welding relative to the pin (between shoulders 13 and 14). Then, two halves of split collar 16 are assembled and threaded around shank-pin unit 11 and the distal end of shoulder 14. Optionally, in another embodiment, two screws 47 are then inserted and tightened to secure split collar 16 to shank-pin unit 11 as shown by arrows B.

Figure 8:
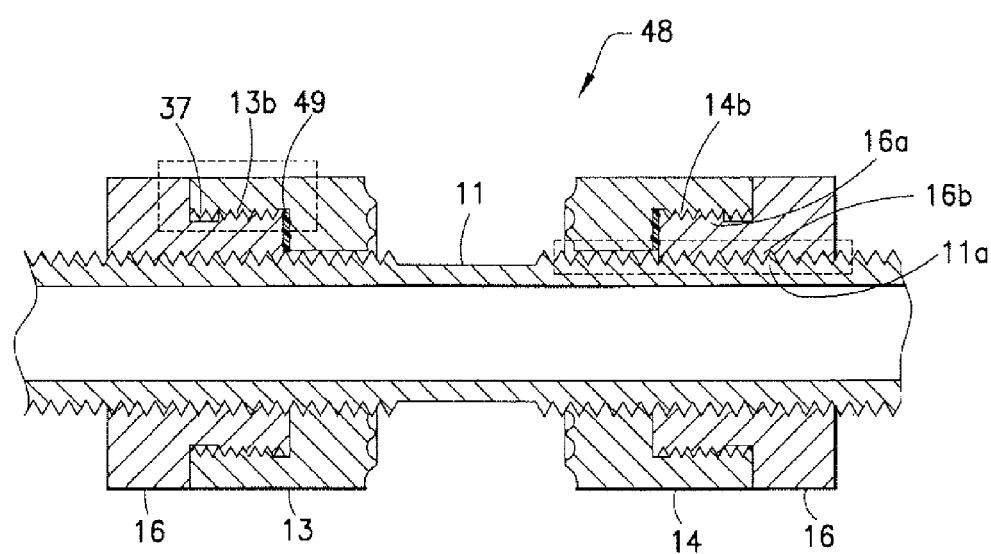
FIG. 8 is a cross-sectional view of one embodiment of a friction stir welding module in accordance with an embodiment of the present invention.

In one embodiment, FIG. 8 shows a cross-sectional view of a friction stir welding module 48 of FSW tool 10 that shows the relationship between shank-pin unit 11, shoulders 13 and 14 and split collars 16. Here, a pocket 49 for the accumulation of plasticized material from friction stir welding is shown between the back of shoulder 14 and the front of split collar 16. There is also an optional tapered pipe thread interface 37 to aid in the locking of split collar to shank-pin unit.

The loading mechanism of the tension rod and the thrust bearing/swivel portion may be placed on the ends of FSW tool in a variety of ways. In one embodiment, the tension rod loading mechanism may be combined with the swivel portion on drive end of the FSW tool. In another embodiment, the loading mechanism of the tension rod and the swivel portion may be on the drive end of the FSW tool but be separate from each other. In further embodiment, the loading mechanism may be on the drive end while the swivel portion is on the other end of the shank-pin unit.

Figure 9:
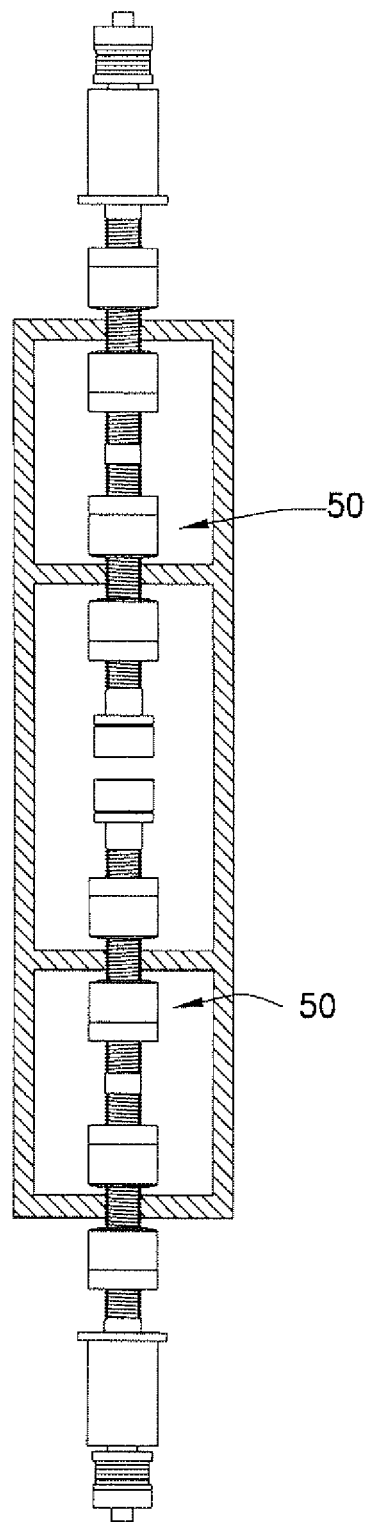
FIG. 9 is an elevational view of one embodiment of two opposing multi-shoulder bobbin type friction stir welding tools for simultaneously welding two parallel joints each in accordance with an embodiment of the present invention.

In one embodiment, FIG. 9 shows two opposing multi-shoulder bobbin type friction stir welding tools 50 for simultaneously welding two parallel joints each.

Figure 10:
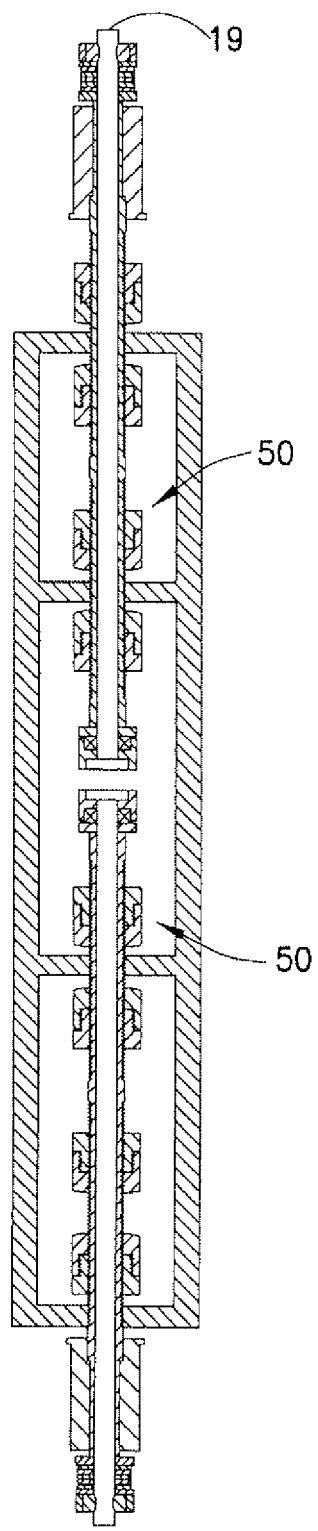
FIG. 10 is a cross-sectional view of one embodiment of the two multi-shoulder bobbin type stir welding tool of FIG. 9 with an internal tension rod.

In one embodiment, FIG. 10 shows the cross-sectional view of FIG. 9 that shows two opposing multi-shoulder bobbin type friction stir welding tools 50 for simultaneously welding two parallel joints each with internal tension rod 19. In another embodiment, shank-pin unit may be solid so there is no internal tension rod disposed along the entire length of the shank-pin unit.

Figure 11:
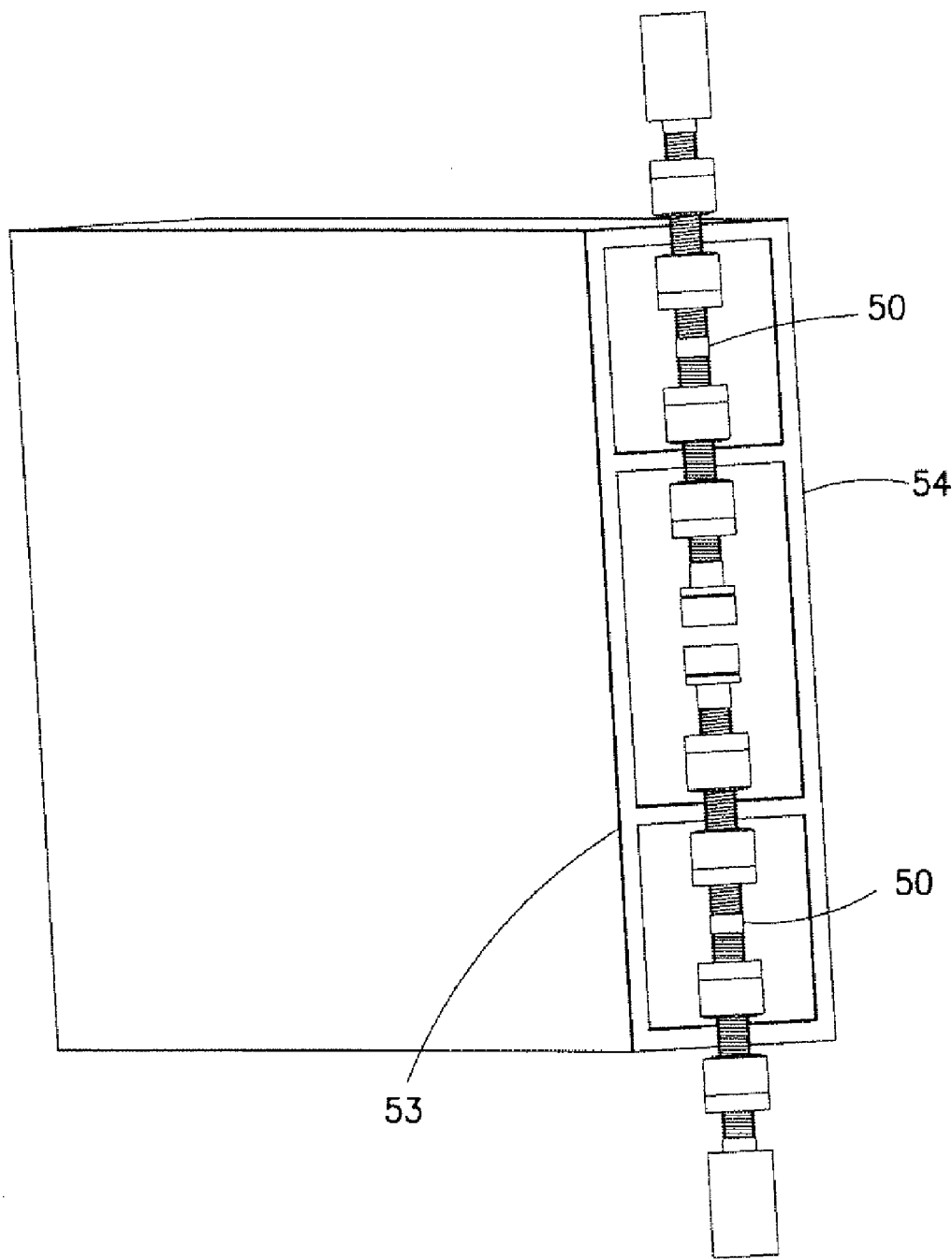
FIG. 11 is a perspective view of one embodiment of two opposing multi-shoulder bobbin type friction stir welding tools of FIG. 10 simultaneously welding two parallel joints each in accordance with an embodiment of the present invention.
Figure 12A:
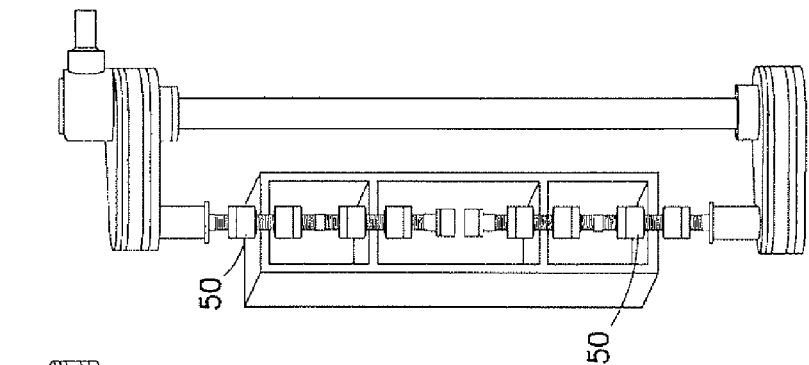
FIGS. 12A, 12B, 12C and 12D are perspective views of one embodiment of types of torque-splitting transmission used to simultaneously and synchronically drive the two multi-shoulder bobbin type friction stir welding tools in accordance with an embodiment of the present invention.
Figure 12B:
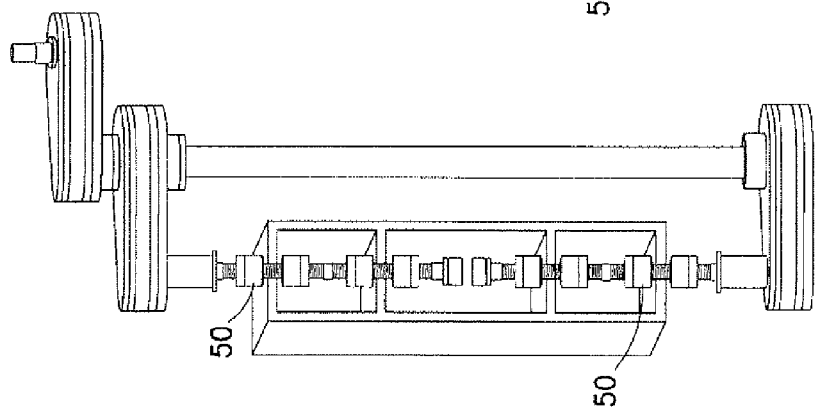
Figure 12C:
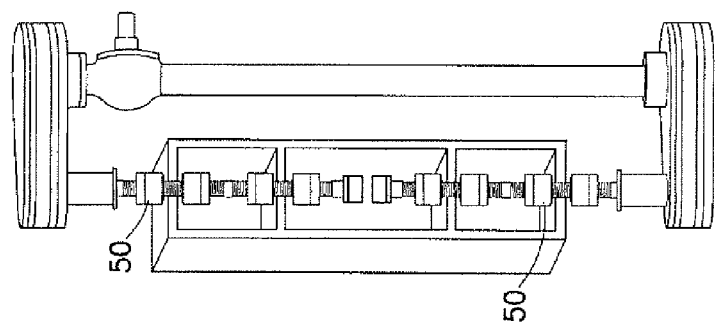
Figure 12D:
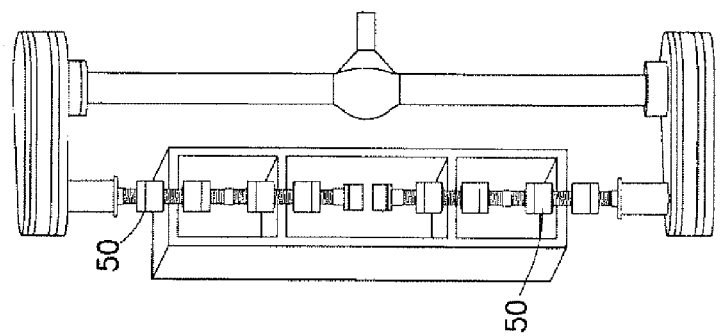

In one embodiment, FIG. 11 shows two opposing multi-shoulder bobbin type friction stir welding tools 50 simultaneously welding two parallel joints each between workpieces 53 and 54.

Figure 13:
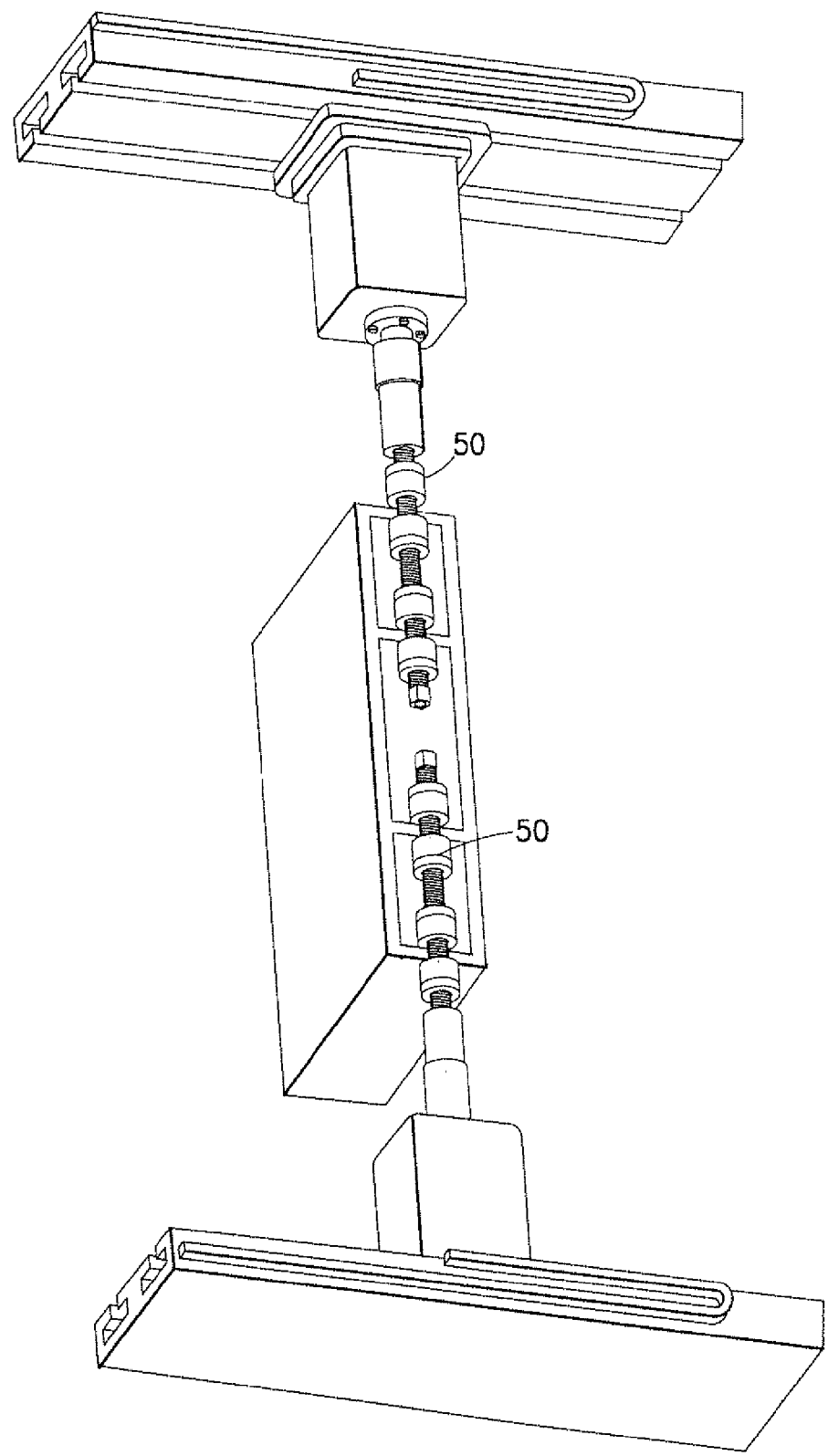
FIG. 13 is a perspective view of one embodiment of two Servo driven motors used to simultaneously and synchronically drive the two multi-shoulder bobbin type friction stir welding tools in accordance with another embodiment of the present invention.

There are many different types of torque-splitting transmissions that may be used to simultaneously and synchronically drive two multi-shoulder bobbin type friction stir welding tools. FIGS. 12A, 12B, 12C and 12D show examples of types of torque-splitting transmission that can be used to simultaneously and synchronically drive the two multi-shoulder bobbin type friction stir welding tools. Further, in another embodiment, the two multi-shoulder bobbin type friction stir welding tools may be driven simultaneously and synchronically by two Servo driven motors as shown in FIG. 13.

Figure 14:
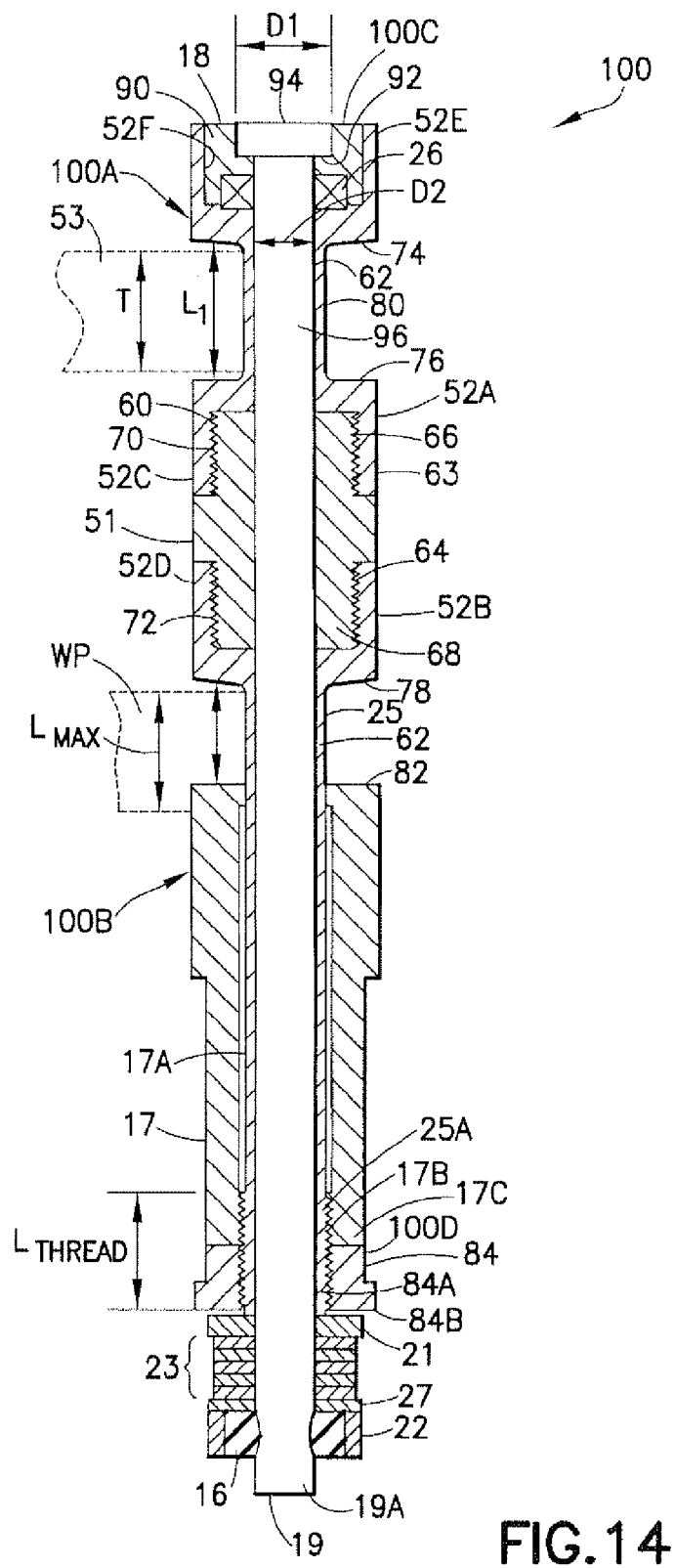
FIG. 14 is a cross-sectional view of one embodiment of the use of a double ended split collar in accordance with another embodiment of the invention.

One embodiment 100 of the present invention, a cross-sectional view shown in FIG. 14, provides for the placement of two monolithic pin-shoulder units 52A, 52B in back-to-back orientation. Multi-shouldered FSW tool 100 consists of two different pairs of monolithic (i.e. not split) shoulder-pin units 52A, 52B that can be cylindrical and hollow (e.g., having a bore-hole 62 therethrough) being coupled together in opposing orientation (e.g., shoulder back 63 to shoulder back 64) by coupler 51. Coupler 51 has outer diameter (OD) 60 with threaded end portions 66 and 68, which are threaded into the inner diameter (ID) threads 70 and 72 of shoulder portions 52C, 52D of monolithic shoulder-pin units 52A, 52B, respectively, to form upper FWS tool part 100A of FWS tool 100. OD/ID thread pairs 66, 70 and 68, 72 are designed with opposing threads (e.g., one set being left-hand threads and the other set being right-hand threads) to form a self-locking mechanism (i.e. counter threads tighten during operation) as tool 100 rotates during the friction stir welding process. Monolithic shoulder-pin unit 52A is a monolithic component comprising two shoulders 74, 76 and a hollow pin 80 disposed therebetween to connect shoulders 74, 76. Hollow pin 80 has a predetermined length L that defines the maximum work piece thickness T of work piece 53 (shown in phantom view) that can be welded. Hollow pin length L must be slightly larger than work piece thickness T to allow plasticized metal to flow around hollow pin 80.

Monolithic shoulder-pin unit 52B is a monolithic part comprising shoulder portion 52D with a single shoulder 78 and a threaded inner diameter 72, and a hollow pin 25 with a threaded outer diameter end 25A. Threaded outer diameter end 25A can be inserted into bore 17A of monolithic shoulder/shank 17 and threaded into threaded inner diameter end portion 17B of bore 17A to form lower FSW tool part 100B of FWS tool 100. Threads of outer diameter end 25A and inner diameter end portion 17B are designed such that a predetermined rotation in degrees or angular displacement of shoulder/shank 17 will longitudinally advance monolithic shoulder-pin unit 52B into or out of shoulder/shank 17 a predetermined linear distance to set gap G between shoulder 78 and shoulder portion 82 of shoulder/shank 17. This arrangement of monolithic pin-shoulder unit 52B with threaded end 25A and threaded inner diameter end portion 17B of bore 17A of shoulder/shank 17 provides for a gap or pin working surface control mechanism such that gap G can be equal to, greater than, or less than length L of pin 80 of monolithic pin-shoulder unit 52A. Therefore, the present invention is not limited to simultaneously welding parallel work pieces of the same thickness.

A further embodiment of the above mentioned FSW tool 100 can include tightening nut 84 with threaded inner diameter (ID) 84A threaded onto outer diameter end 25A and into an abutting relationship with shoulder/shank end 17C to rotationally lock shoulder/shank 17 where operational torsional loading causes gap G to vary during FSW.

Other embodiments (not shown) of the tool 100 comprising three (3) or more pin sections can be created with a series of couplers 51 threaded into threaded inner diameter 52F (not shown) of distal end 52E of monolithic shoulder-pin unit 52A.

Another embodiment of FSW tool 100 can include tension rod 19 (discussed in detail above) inserted into distal end 52E of monolithic shoulder-pin unit 52A to pass through bore-holes 62 of monolithic shoulder-pin units 52A, 52B to extend proximate end 19A of tension rod 19 through shoulder/shank end 17C and end 84B of tightening nut 84 (when tightening nut 84 is used). Tension rod 19 can induce a compressive assembly load on to the entire FSW tool 100 such that the alternating stress range of the working surfaces, for example shoulders 74, 76, 78 and pins 62, of the FSW tool 100 are lowered to impart extra durability (e.g., low cycle fatigue, high cycle fatigue, and crack propagation) into tool 100 by making it more resistant to a combination of cyclic flexing and torsional type loading. As shown in FIGS. 3A and 3B and discussed above, tension rod 19 can to put under tension at shoulder/shank end 17C of shoulder/shank 17. The tensioning mechanism comprises a race/support 21 and a collar retainer 22 underneath which is located a split collar 16, a washer 27, and a plurality of disc springs 23 therebetween as shown in FIG. 3A. Race/support 21 and disc springs 23 may, for example only, be a Belleville™ race/support and a Belleville™ disc springs, respectively.

To decouple the tension rod 19 from the torsional-type "twisting" of the tool's hollow pins, a swivel mechanism 90 is placed at the distal end 100C of tool 100 opposing the proximal end 100D at which the Bellville™ washers 23 based rod-tensioning mechanism is located. Swivel mechanism 90 comprises thrust bearing retainer 18 holding thrust bearing 26 in place. Thrust bearing retainer 18 includes a recess 92 to seat distal end 94 of tension rod 19. Distal end 94 has diameter D1 larger than diameter D2 of shaft 96 of tension rod 19. One of the purposes of thrust bearing 26 is to disengage and relieve the internal tension rod 19 from the torsion experienced by the pins during the FSW operation when the torsional load exceeds fatigue capability of the shoulders 74, 76 or pin 80 of the dual shoulder monolithic shoulder-pin unit or the shoulder 78 or pin 25 of the single shoulder monolithic shoulder-pin unit.

Figure 15A:
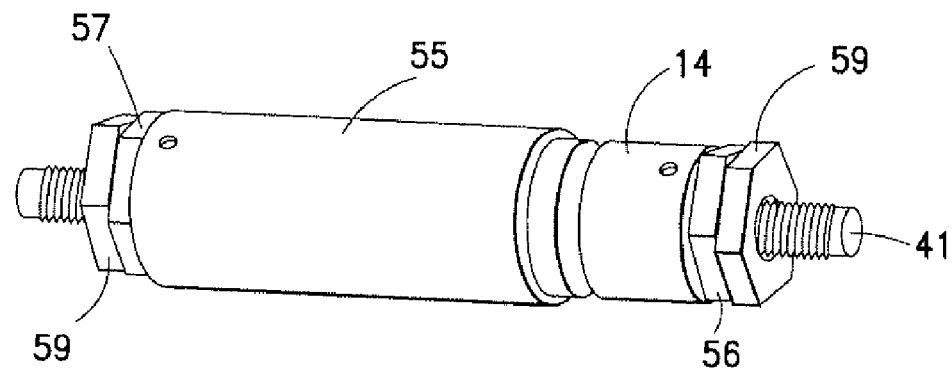
FIGS. 15A and 15B are elevational views of one embodiment of assembling a shoulder and a driving shank onto the shank-pin unit with a capture adjusting nut in accordance with an embodiment of the present invention.
Figure 15B:
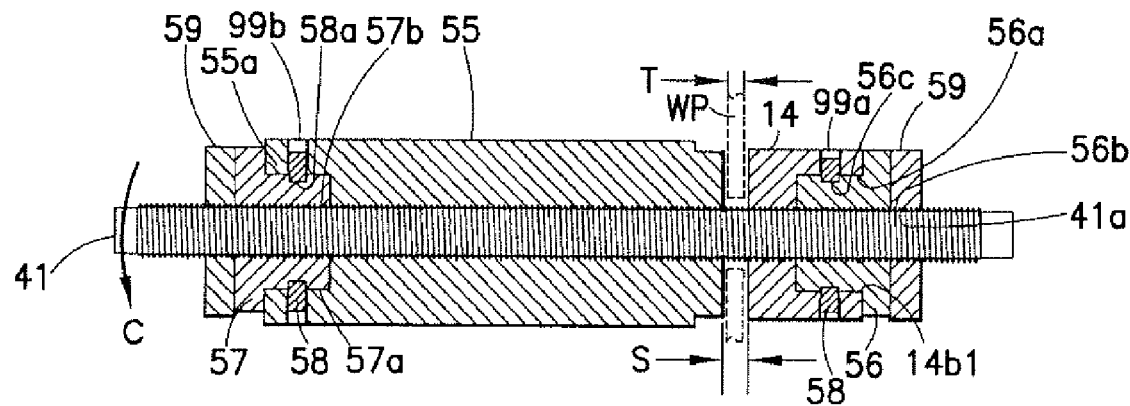

In one embodiment, FIGS. 15A and 15B show how capture adjusting nut 56 is attached to shoulder 14. Here, capture adjusting nut 56 has a threadless outside diameter 56*a* and a threaded inside diameter 56*b*. The threads on the inner diameter 56*b* of capture adjusting nut 56 are threaded on an outer diameter 41*a* of shank-pin unit 41 and at the same time it is inserted into the threadless inner diameter 14*b*1 of shoulder 14 as shown in FIG. 15B. The outside diameter of capture adjusting nut 56 has a smooth groove 58*a* that is designed to "receive" the ends of screws 58. Screws 58 may freely turn/slide in groove 58*a*, as capture adjusting nut 56 is turned along pin 41 and thus moving shoulder 14 with it longitudinally along the axis of pin 41. Then screws 58 are screwed into substantially radial set screw holes 99A in the wall of shoulder 14, to the point where the screw ends are placed in smooth groove 58*a*.

FIGS. 15A and 15B also show how capture adjusting nut 57 is attached to a drive shank with integrated shoulder 55. Here, capture adjusting nut 57 has a threadless outside diameter 57*a* and a threaded inside diameter 57*b*. Capture adjusting nut 57 is threaded over outside diameter 41A thread on pin 41 and at the same time it is inserted into the threadless inner diameter 55A of drive shank-shoulder 55 as shown in FIG. 15B. The outside diameter of capture adjusting nut 57 has a smooth groove 58*a* that is designed to "receive" the ends of screws 58. Screws 58 may freely turn/slide in groove 58*a*, as capture adjusting nut 57 is turned along pin 41 and thus moving shank-shoulder 55 with it longitudinally along the axis of pin 41. Then screws 58 are screwed into substantially radial set screw holes 99B in the wall of the shank-shoulder 55, to the point where the screw ends are placed in smooth groove 58*a*.

This arrangement of adjustable drive shank-shoulder 55 and shoulder 14 provides for varying space S between the two shoulders, 14 and 55 that defines the length of the working surface of the pin portion by rotating the capture adjusting nut 57, which moves along the threaded outside diameter 41A of shank-pin unit 41, while "moving with it" the shank-shoulder 55, whose internal diameter is threadless and is attached to adjusting nut 57 through two pins, 58, that slide within groove 58*a* on the outside diameter of nut 57, as shown in arrow C in FIG. 15B. Space S is slightly larger than the thickness T of the work pieces (shown in phantom view) to allow plastisized metal to flow around pin working surface 98. Threaded tightening nuts 59 can be threaded on outside diameter 41A on both ends of shank-pin unit 41 and abutted against capture adjusting nuts 56, 57 to rotationally lock shoulder 14 and integrated shoulder 55, respectively, where operational torsional loading causes space S to vary during FSW.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A multi-shouldered friction stir welding tool comprising:
    a dual shoulder monolithic shoulder-pin unit having a pair of opposingly oriented shoulders with a pin portion of a predetermined length disposed therebetween, and a bore-hole through the pair of opposingly oriented shoulders and the pin portion, wherein each shoulder of the pair of opposingly oriented shoulders includes an end having a recess therein, wherein at least one recess being threaded;
    a single shoulder monolithic shoulder-pin unit having a shoulder, a pin portion, and a bore-hole through the shoulder and the pin portion, wherein the shoulder includes an end having a threaded recess therein, wherein a portion of the pin portion is threaded;
    a coupler having a first threaded end, a second threaded end, and a bore-hole therethrough, wherein the first threaded end being operably compatible with the threaded recess of the dual shoulder monolithic shoulder-pin unit and the second threaded end being operably compatible with the threaded recess of the single shoulder monolithic shoulder-pin unit; and
    a monolithic shoulder/shank unit having a shoulder and a bore-hole therethrough, wherein a portion of the bore-hole is threaded and operably compatible with the threaded portion of the pin such that an adjustable gap is formed between the shoulder of the monolithic shoulder/shank unit and the shoulder of the single shoulder monolithic shoulder-pin unit when the single shoulder monolithic shoulder-pin unit is rotated relative to the monolithic shoulder/shank unit, whereby a plurality of work pieces of same or different thicknesses can be simultaneously welded.

2. The multi-shouldered friction stir welding tool according to claim 1 further comprising (i) a tension rod operably connected to the pin portions of the dual shoulder monolithic shoulder-pin unit and the single shoulder monolithic shoulder-pin unit to apply a compression load onto the pin portions when the tension rod is placed in tension, and (ii) a tension rod load applying mechanism connected to the tension rod to place the tension rod in tension.

3. The multi-shouldered friction stir welding tool according to claim 1 further comprises a coupler self locking mechanism.

4. The multi-shouldered friction stir welding tool according to claim 3 wherein the coupler self locking mechanism comprises a thread orientation of the first threaded end of the coupler and the threaded recess of the dual shoulder monolithic shoulder-pin unit being opposite a thread orientation of the second threaded end of the coupler and the threaded recess of the single shoulder monolithic shoulder-pin unit such that as the multi-shouldered friction stir welding tool rotates during the friction stir welding operation the coupler tightens within the dual shoulder monolithic shoulder-pin unit and the single shoulder monolithic shoulder-pin unit.

5. The multi-shouldered friction stir welding tool according to claim 2 further comprises a torque release mechanism operably connected to the tension rod and to the dual shoulder monolithic shoulder-pin unit to release the tension rod from the dual shoulder monolithic shoulder-pin unit when the torsional load exceeds fatigue capability of the dual shoulder monolithic shoulder-pin unit or the single shoulder monolithic shoulder-pin unit.

6. The multi-shouldered friction stir welding tool according to claim 1 further comprises a lock nut threaded onto the threaded portion of the pin portion of the single shoulder monolithic shoulder-pin unit into an abutting relationship with the monolithic shoulder/shank unit.

* * * * *